United States Patent [19]

Omori et al.

[11] Patent Number: 5,687,874
[45] Date of Patent: Nov. 18, 1997

[54] DEVICE FOR HOLDING ARTICLE

[75] Inventors: Toshiyuki Omori; Kinji Oda; Tamaki Kikuchi; Takeshi Inose, all of Tokyo, Japan

[73] Assignee: KAO Corporation, Tokyo, Japan

[21] Appl. No.: 600,176

[22] Filed: Feb. 12, 1996

[30] Foreign Application Priority Data

Feb. 14, 1995 [JP] Japan .................................. 7-25559
Oct. 3, 1995 [JP] Japan .................................. 7-256549

[51] Int. Cl.⁶ .................................................. B65D 81/02
[52] U.S. Cl. .......................... 220/737; 220/739; 220/903; 220/448
[58] Field of Search .................................. 220/737, 739, 220/903, 732, 448, 655, 400, 403, 468, 470, 720, 906

[56] References Cited

U.S. PATENT DOCUMENTS

| | | | |
|---|---|---|---|
| 958,087 | 5/1910 | Bulman | 220/448 |
| 2,919,046 | 12/1959 | Parsons | 220/448 |
| 3,003,656 | 10/1961 | Hardigg | 220/448 |
| 3,064,801 | 11/1962 | Linnell | 220/448 |
| 3,090,478 | 5/1963 | Stanley | 220/737 |
| 3,199,552 | 8/1965 | Nordfors . | |
| 3,339,722 | 9/1967 | Van Antwerpen | 220/448 |
| 3,837,479 | 9/1974 | Lehmann | 220/448 |
| 3,918,920 | 11/1975 | Barber | 220/903 |
| 3,941,237 | 3/1976 | MacGregor, Jr. . | |
| 4,964,529 | 10/1990 | Houston | 220/737 |
| 5,014,868 | 5/1991 | Wittig et al. . | |

FOREIGN PATENT DOCUMENTS

| | | |
|---|---|---|
| 0600130 | 6/1994 | European Pat. Off. . |
| 0398826 | 4/1991 | Japan . |

*Primary Examiner*—Stephen J. Castellano
*Attorney, Agent, or Firm*—Birch Stewart Kolasch & Birch, LLP

[57] ABSTRACT

The device for holding an article according to the present invention comprises an external frame member defining a chamber and having an opening at one end thereof, and a resilient holding member mounted within the chamber and capable of holding an article which has been introduced into the chamber. The resilient holding member is mounted on the external frame member of the chamber such that the article is held by the resilient holding member in a desired position at a central portion of the chamber.

3 Claims, 13 Drawing Sheets

DEVICE FOR HOLDING ARTICLE

BACKGROUND OF THE INVENTION

The present invention relates to a device for holding an article, and more particularly to a device for holding an article, wherein articles of various shapes can reliably be held, one at a time, by a simple construction such that the article can be freely inserted and removed from the device while maintaining a correct, upright position.

Heretofore, when performing various procedures, for example, when filling a container and/or fitting a cap to an article such as a container having a horizontal oblong shape, in section, an article holding device capable of holding one article at a time is used in order to move the article on a transfer path while holding the article. As one such device for holding an article, there can be contemplated a device for holding a lower portion of an article by a rigid member. However, in order to use the device for general purposes, that is, to allow the device to hold several types of articles having different shapes, the surface of the rigid member needs to be formed into a flat surface. In this case, the side surface of the article is held by point contact instead of by surface contact. As a consequence, it gives rise to the problem that the article tends to move due to insufficient holding. Accordingly, in order to reliably hold the article, a plurality of rigid members, each corresponding to a different shape of the article, must be prepared. Thus, the general purpose property of the holding device is impaired.

In order to solve the above problem, there is provided a device for holding an article such as that disclosed in the official gazette of Japanese Laid-Open Patent Application 3-98826. This device for holding an article comprises an external frame and a diaphragm portion mounted on the external frame through a closed space formed therebetween. When the article is placed within the external frame, pressurized air is supplied to the closed space by an air supply/discharge mechanism disposed on the transfer path so that the diaphragm portion is expanded to closely contact and hold the article. For removing the article from the external frame, the air introduced into the closed space by the air supply/discharge mechanism is discharged whereby the diaphragm portion contracts. As a consequence, the close contact between the diaphragm and the article is eliminated to facilitate the easy removal of the article.

However, although the device for holding the article as described in the official gazette of the Japanese Laid-Open Patent Application 3-98828 is capable of holding articles having different shapes, it has the problem that since an air supply/discharge mechanism must be provided for supplying and discharging pressurized air to and from the closed space in order to hold the article, the whole device becomes complicated.

SUMMARY OF THE INVENTION

It is, therefore, an object of the present invention to provide a device capable of holding articles of various shapes, one at a time, such that the article can be freely inserted and removed from the device in a correct upright position.

The present invention can achieve the above object by providing a device for holding an article comprising an external frame member 1 having an opening portion 11a (or 14a) facing upwardly and a resilient holding member Z mounted within the external frame member 1 and capable of holding an article 3 such that the article can be introduced into and released from the external frame member 1. The resilient holding member 2 is mounted on the external frame member 1 such that the article 3 is held by the resilient holding member 2 in an upright position at a central portion of the external frame member 1. Advantageously, a plurality of resilient holding members 2 can be arranged with surfaces 21 facing toward the center of the external frame member 1. Also, two of the resilient holding members 2 can be disposed on each of the opposing inner surfaces of the external frame member 1.

The resilient holding member 2 can be made of a member having a generally X-shaped configuration in development and a slit 2a formed generally in the central area thereof and in the horizontal direction such that the resilient holding member 2 itself can be readily and resiliently deformed.

In another embodiment of the present invention, four or more of the resilient holding members 2 are provided in such a manner that the device can cope with two or more different shapes of the article 3.

According to the device of the present invention, articles of various shapes can be reliably held, one at a time, by a simple construction such that the article can be freely inserted and removed while maintaining its upright position.

BRIEF DESCRIPTION OF THE DRAWINGS

FIGS. 3(a) to 3(c) are sectional views showing the method for inserting an article into the device according to the one embodiment (first embodiment) of the present invention, wherein

FIGS. 9(a) to 9(h) are plan views showing various arrangements of the resilient holding members according to the present invention.

FIG. 10(a) to 10(c) are sectional views showing various mounting forms of the resilient holding members in the article holding device according to the present invention.

DETAILED DESCRIPTION OF THE INVENTION

Figure 1:
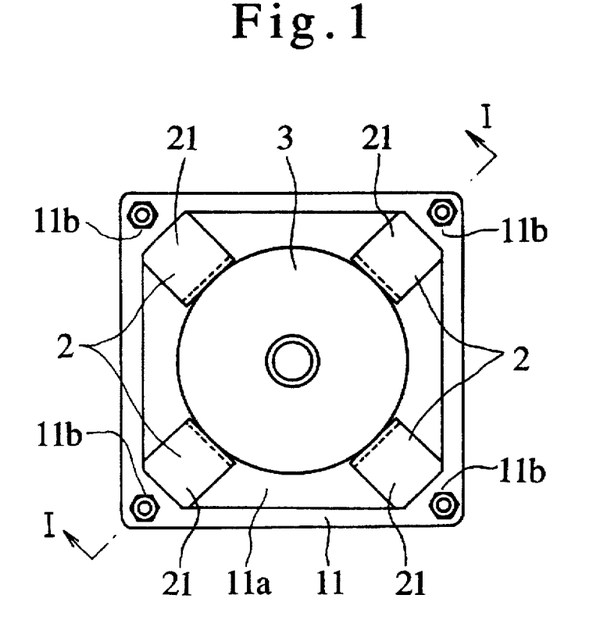
FIG. 1 is a plan view showing one embodiment (first embodiment) of a device for holding an article according to the present invention, in which the article is disposed within the device.
Figure 2:
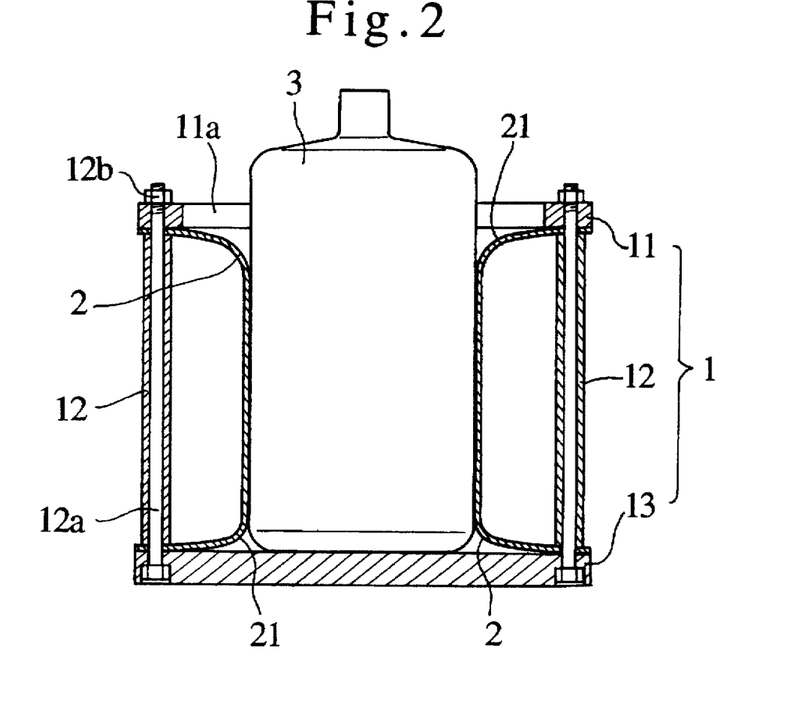
FIG. 2 is a sectional view taken on line I—I of FIG. 1.
Figure 3A:
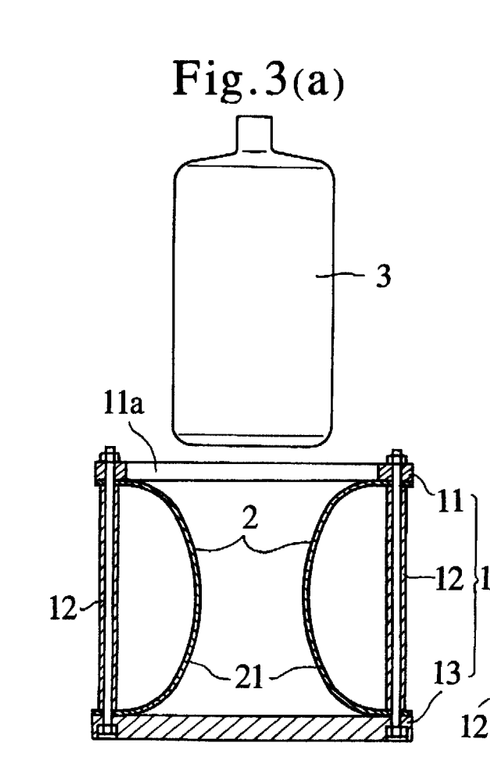
FIG. 3(a) shows a preliminary state in which the article has not yet reached the device.
Figures 3B, 3C:
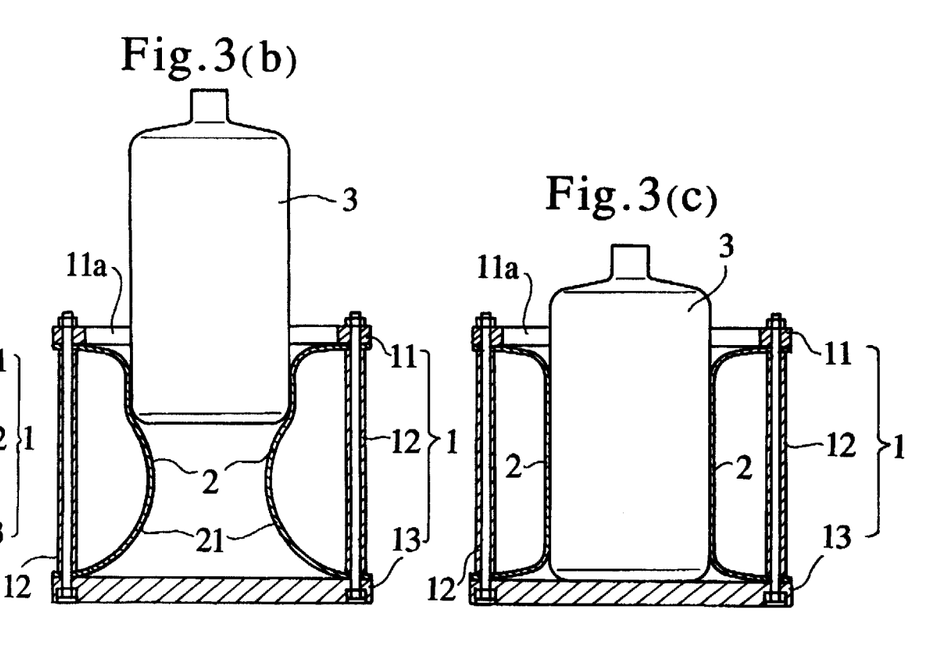
FIG. 3(b) shows the state in which the article is in the course of being inserted into the device.
FIG. 3(c) shows the state in which the article is fully disposed within the device.
Figure 4A:
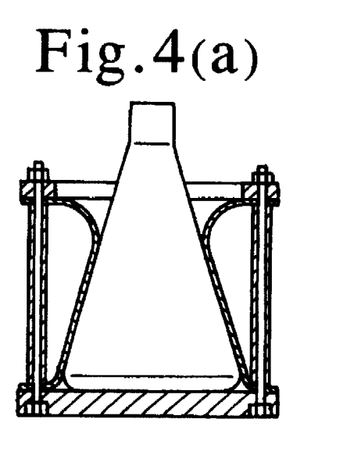
FIGS. 4(a) to 4(d) are views showing states in which articles of different shapes are held in the device, similarly as in FIG. 2.
Figure 4B:
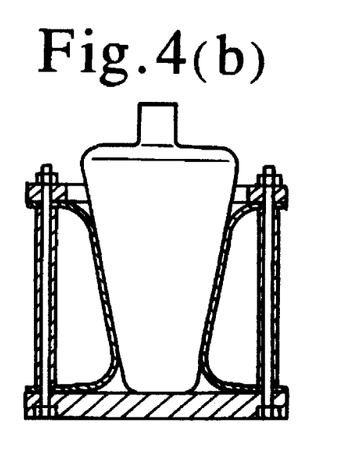
Figure 4C:
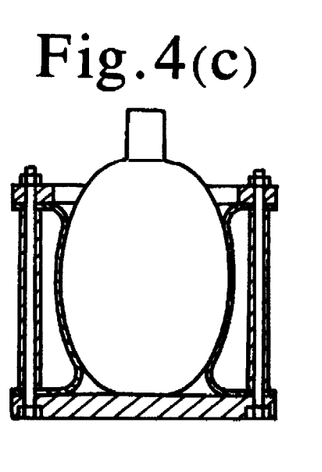
Figure 4D:
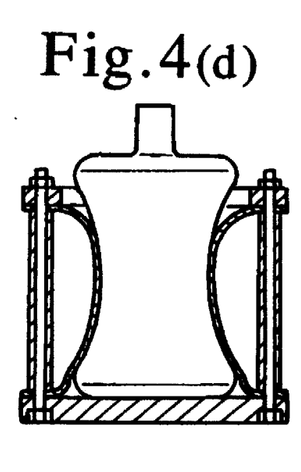

One embodiment (first embodiment) of the device for holding an article according to the present invention will be described with reference to the drawings. FIG. 1 is a plan view of this embodiment (first embodiment) in which an article is held in the device; FIG. 2 is a sectional view taken along line I—I of FIG. 1; and FIG. 3 is a sectional view showing a method for inserting and holding an article according to this embodiment (first embodiment).

The device for holding an article according to this embodiment (first embodiment) is shown in FIGS. 1 and 2 and comprises an external frame member 1 having an opening portion 11a facing upwardly, and four resilient holding members 2, 2 . . . mounted within the external frame member 1. The resilient holding members 2, 2 . . . are mounted on the external frame member 1 such that they are arranged on inner surfaces of four corners of the external frame members 1 over the entire length thereof in a vertical direction with surfaces 21, 21 . . . of the resilient holding members 2, 2 . . . faced toward the center of the external frame member 1.

The device for holding an article according to this embodiment (first embodiment) of the present invention will now be described in more detail. The external frame member 1 comprises an upper surface frame 11, four columns 12, 12 . . . , and a bottom surface frame 13. The upper surface frame 11 has a generally regular square frame configuration. The above-mentioned opening 11a, which has an octagonal frame configuration, is formed in a central portion of the upper surface frame 11. Connecting portions 11b, 11b . . . are formed on the four corners of the upper surface frame 11, respectively. The connecting portions 11b, 11b . . . function as connecting parts on upper ends of the columns 12, 12 . . . , respectively and also as reinforcing parts for enhancing the strength of the overall upper surface frame 11. The bottom surface plate 13 is a plate having a generally same configuration as the outer configuration of the upper surface frame 11. Upper ends of the columns 12, 12 . . . are connected to the connecting portions 11b through one end of the respective, resilient holding members 2, and the lower ends of the columns 12, 12 . . . are connected to the four corners of the bottom surface plate 13 through the other ends of the respective, resilient holding members 2. Each column 12 is a hollow tube and secured to the upper surface frame 11 and the lower surface plate through a common bolt 12a and nut 12b.

The sizes of the upper surface frame 11 and the bottom surface plate 13 are determined by the size and shape of the article 3 to be transferred. The size of the opening portion 11a is designed to be sufficiently larger than the outer configuration in plan view of the article 3. Similarly, the height of the external frame member 1 is determined considering the height and shape of the article 3 to be transferred. This height can be adjusted by adjusting the length of each column 12.

One of the resilient holding members 2, 2 . . . mounted on the plurality of locations will be described as one example. The remaining resilient holding members 2 will also have the same construction. No limitation is imposed on the material of the resilient holding member 2 as long as the material can exhibit resiliency toward the center of the external frame member 1 when the resilient holding member 2 is mounted on the external frame member 1. Examples of the material include the same material as that of a general conveyor belt, a material made of synthetic resin such as an acrylic resin or a polyester resin, a metal such as stainless steel or a spring steel, paper, cloth, rubber and the like. These materials, when used as the resilient holding member 2, ape formed into a belt-shaped member. The width of the resilient holding member 2 is preferably 10 mm to 30 mm.

The upper surface 21 of the resilient holding member 2, which is in surface contact with one side surface of the article 3, is a flat and smooth surface, so that the article 3 can easily be inserted from above into the space defined by the resilient holding members 2, 2 . . . which are mounted on a plurality of locations within the external frame member 1. The plurality of locations, where the resilient holding members 2, 2 . . . are mounted, are arranged at predetermined intervals. In this embodiment, the locations are arranged at predetermined intervals at the apexes of the upper surface frame 11 and the bottom surface plate 13.

The length of the resilient holding members 2 . . . is determined in accordance with the size and shape of the article 3 to be transferred, so that when the article 3 is held in the external frame member 1, the resilient holding members 2, 2 . . . are deformed and the side surfaces of the article 3 are held by the resilient restoring force thereof. If the length of the resilient holding members 2, 2 . . . is too short, deformation of the resilient holding members 2, 2 . . . becomes small when the article 3 is held, so that the resilient restoring force is not sufficient enough to hold the article 3. In contrast, if the length of the resilient holding members 2, 2 . . . is too long, deformation of the resilient holding members 2, 2 . . . becomes large when the article 3 is held, so that the resilient restoring force becomes too strong to allow the article 3 to be inserted smoothly into the external frame member 1.

In order to hold the article 3 by the device according to the embodiment as shown in FIG. 3(a), the article 3 is inserted into the opening portion 11a from above the external frame member 1. At that time, the resilient holding members 2, 2

... are resiliently deformed, as shown in FIG. 3 (b), by its dead weight or by the inserting force of an inserting mechanism for article 3. When the article 3 is inserted so far as to contact the bottom surface plate 13, as shown in FIG. 3 (c), the resilient holding members 2, 2 ... are inclined to be restored to their original shape by their resilient restoring force. As a consequence, the surfaces 21, 21 ... are caused to contact the side surfaces of the article 3, so that the article is urged toward the center of the external frame member 1 from four directions. In this way, the article 3 is held by the resilient holding members 2, 2 ...

Since the device for holding an article according to this embodiment (first embodiment) of the present invention is thus constructed, as shown in FIGS. 4(a) to 4(d), the resilient holding members 2, 2 ... are deformed in accordance with the various shapes of the articles 3, and the side surfaces of the articles 3 can be reliably held by the surfaces 21, 21 ... of the resilient holding members 2, 2 ... from a plurality of directions, without the need of a complicated supporting structure. Furthermore, since the side surfaces of the articles are held by the surfaces of the resilient holding members 2 from a plurality of directions, the articles can be held in their correct upright position without being moved. Moreover, since the device is of a simple construction, formed of the external frame member 1 and the resilient holding members 2, the article holding device itself is not very complicated. Thus, repair and changes of the mounting shape of the resilient holding members 2 can be made with ease. Since the resilient holding members 2 are arranged in a plurality of locations at predetermined intervals, the article 3 is urged toward the center of the external frame member 1 from a plurality of directions with predetermined intervals and is reliably held therein.

Figure 5:
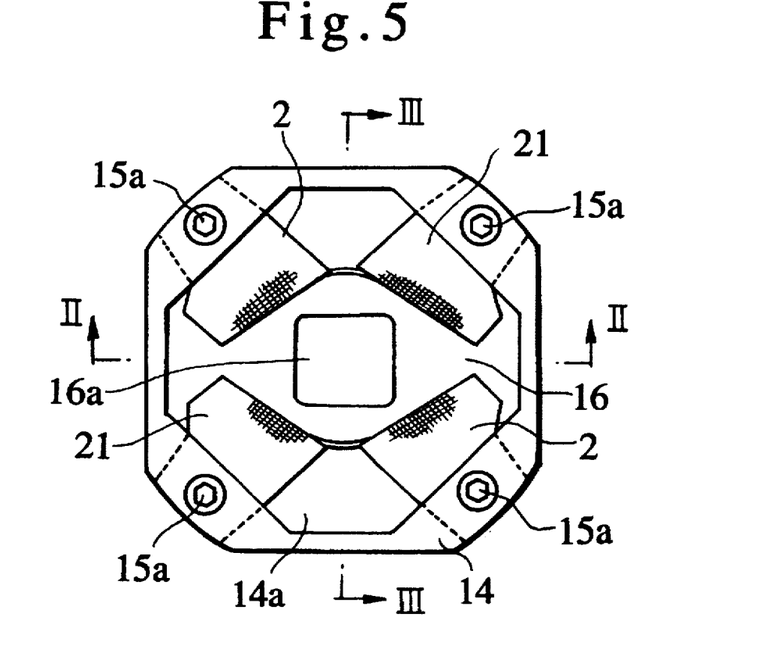
FIG. 5 is a plan view of an article holding device according to a second embodiment of the present invention, in which no article is present in the device.
Figure 6:
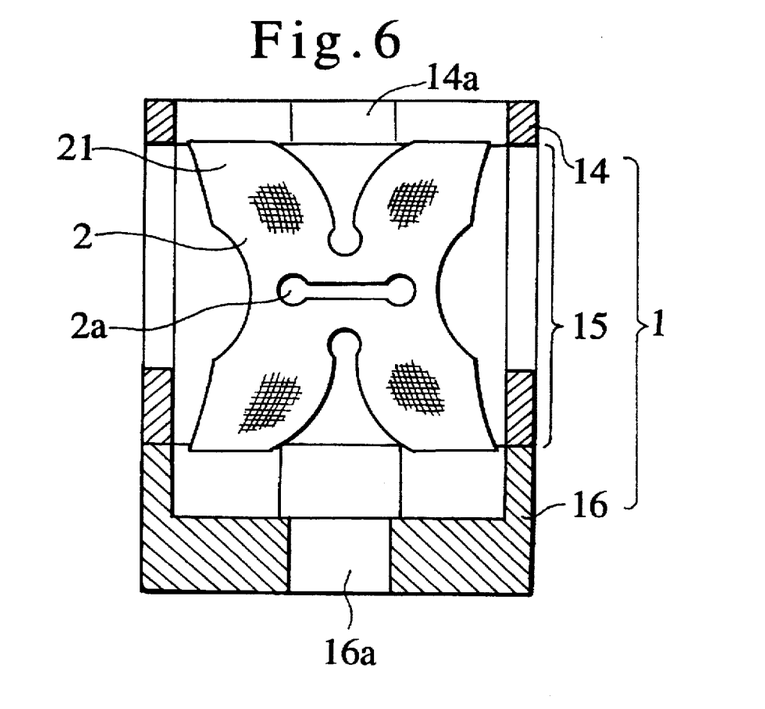
FIG. 6 is a sectional view taken along line II—II of FIG. 5.
Figure 7:
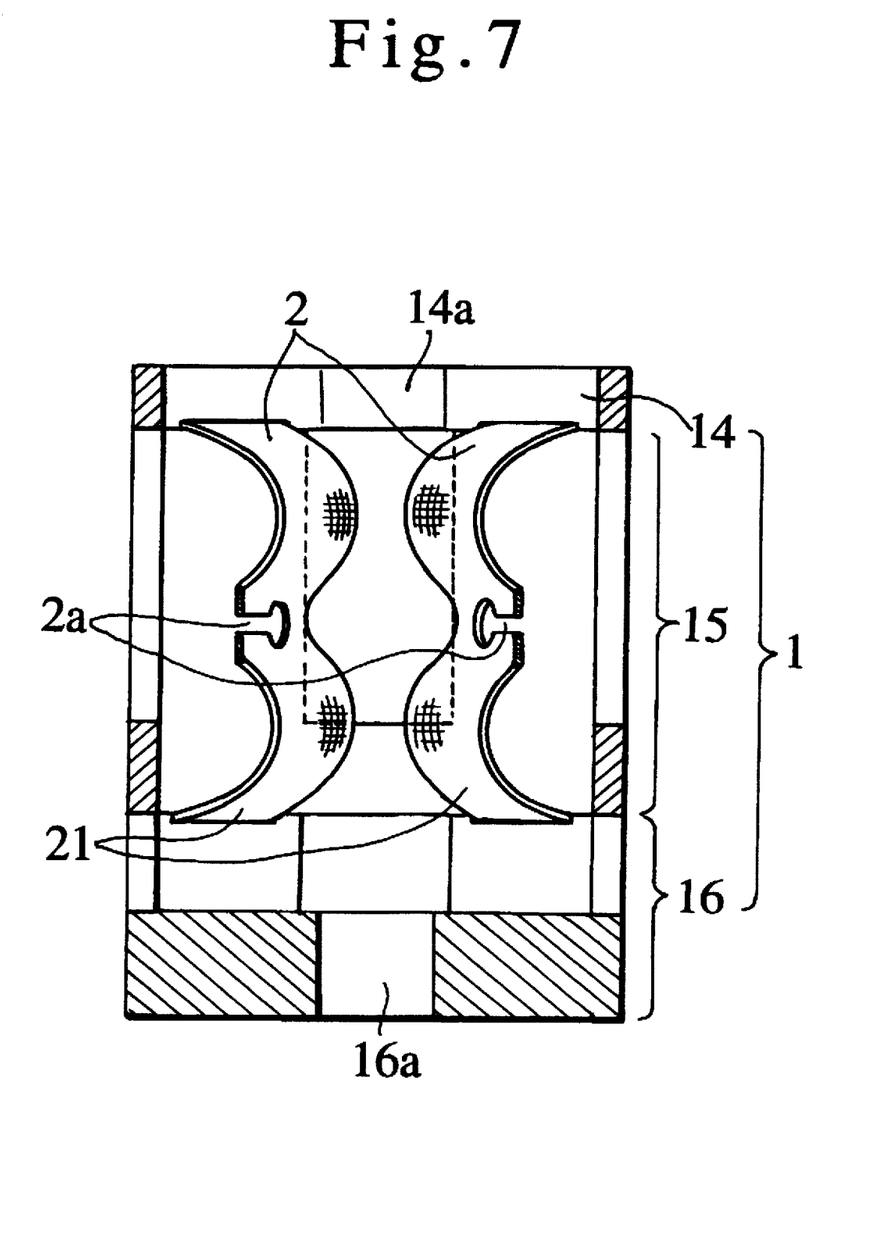
FIG. 7 is a sectional view taken along line III—III of FIG. 5.

Next, the most preferred embodiment (second embodiment) of the present invention will be described with reference to the drawings. FIG. 5 is a plan view of this embodiment (second embodiment), in which no article is yet held by the device; FIG. 6 is a sectional view taken along line II—II of FIG. 5; FIG. 7 is a sectional view taken along line III—III of FIG. 5; and FIG. 8 is a perspective view of this embodiment (second embodiment), in which an article is held by the device.

The device for holding an article according to this embodiment (second embodiment) is different from that of the first embodiment in that an external frame member 1 comprises, as shown in FIGS. 5 to 7, an upper member 14, an intermediate member 15 and a lower member 16. Two resilient holding members 2, 2 are mounted on the external frame member 1 at four places in total, two at the upper parts and two at a lower part thereof.

Figure 8:
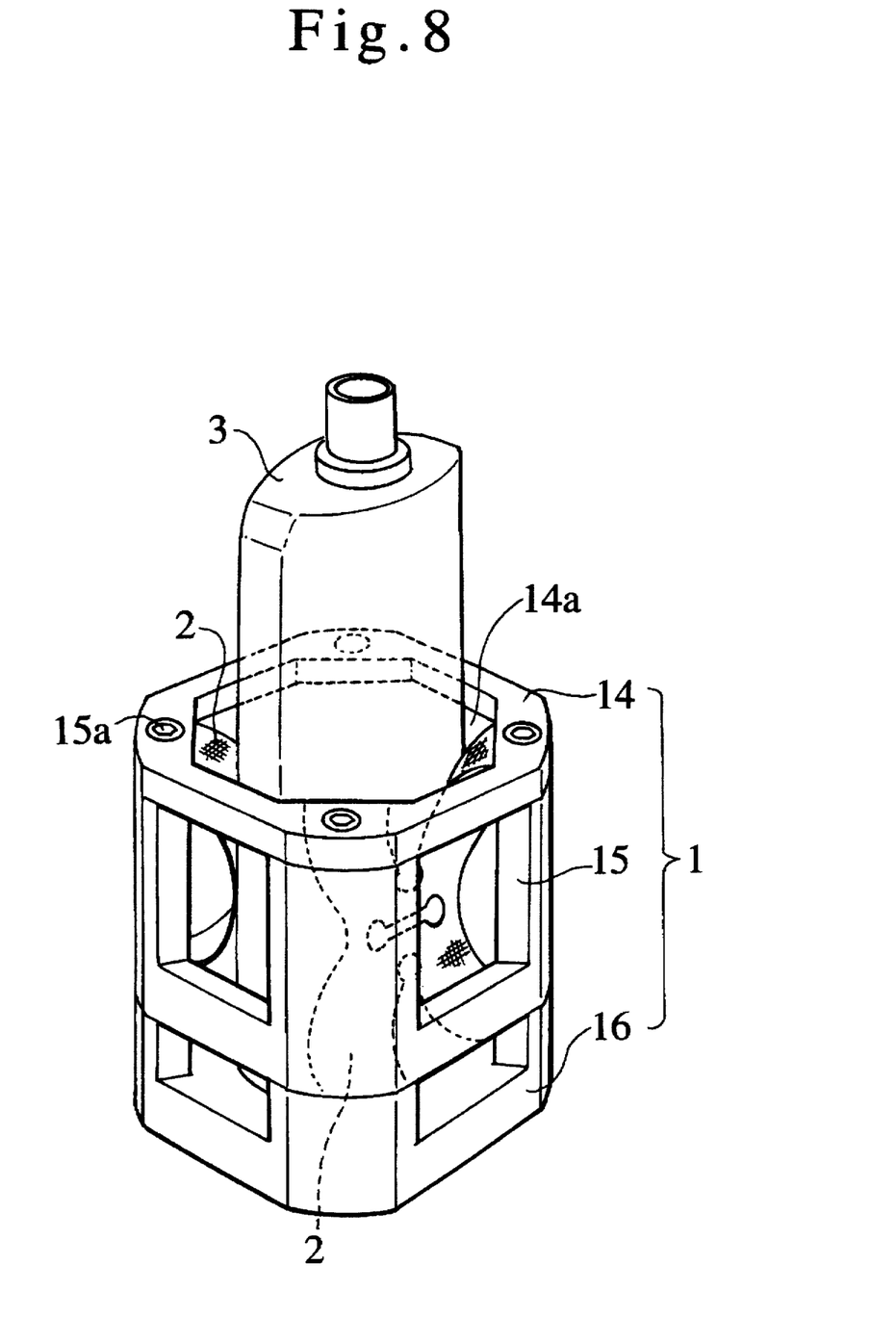
FIG. 8 is a perspective view showing the outer appearance of the second embodiment of the article holding device according to the present invention, in which the article is disposed in the device.

As shown in FIG. 8, the external frame member 1 according to this embodiment (second embodiment) comprises the upper member 14, the intermediate member 15 and the lower member 18. These three component members have generally an octagonal configurations in plan view, in which four apex portions of a regular square are cut away. The upper member 14 is a member corresponding to the upper surface frame 11 of the first embodiment and has an octagonal opening portion 14 formed in a central portion thereof and similar to the opening portion 11a formed in the upper surface frame 11. The widths of two sets of opposing sides ape increased, and bolts 15a as later described are positioned in the increased width portions (i.e., the sides of increased width). The intermediate member 15 corresponds to columns 12 of the first embodiment. The intermediate member 15 comprises a frame-like portion and vertical portions erected from portions of the frame-like members corresponding to the increased width portions. The lower member 18 corresponds to the bottom surface plate 13 of the first embodiment. The lower member 18 comprises a bottom surface portion and connecting portions erected from the increased width portions and portions corresponding to the vertical portions. An opening portion 16a is formed in the center of the bottom surface portion.

Each resilient holding member 2 has a generally X-shaped configuration and has a horizontally extending slit 2a formed in the central area thereof so that the resilient holding member 2 itself can be readily deformed.

The resilient holding member 2 is formed of a material having a duplicate layer construction. A layer on the side of the upper surface 21 is formed of a layer of a material having a good sliding property, whereas the other layer on the side of the lower surface is formed of a layer of material having a favorable property for exhibiting a resilient restoring force. Fine concavities and convexities are formed on the upper surface 21 of the resilient holding member 2 in order to further enhance the sliding property. Due to the concavities and convexities, the area of the upper surface 21 of the resilient holding member which contacts the side surface of the container 3, is reduced.

As shown in FIG. 7 (second embodiment), the upper ends of the resilient holding members 2, 2 are sandwiched between the upper member 14 and the intermediate member 15, and lower ends of the resilient holding members 2, 2 are sandwiched between the intermediate member 15 and the lower member 18. These component members are integrally assembled, as shown in FIG. 8, by bolts 15a, 15a ... which extend from the upper member 14 to the lower member 16. When assembled, the resilient holding members 2, 2 are mounted in their inwardly flexed states in accordance with the size of the article 3.

The device for holding an article according to this embodiment (second embodiment) is thus constructed, and is used in the same manner as the device according to the first embodiment. According to the device for holding an article according to this embodiment (second embodiment), the side surface of the article can be more widely held from the side. When the article has unusual shapes, the holding device of the second embodiment can hold the article better than that of the first embodiment. Further, according to the device for holding an article of this embodiment (second embodiment), since the opening portion 16a is formed in the center of the lower member 18, the article can be pushed out from under when the article 3 is taken out of the device.

Figure 9A:
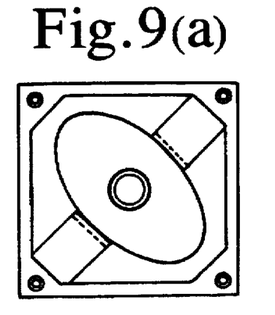
FIGS. 9(a) and 9(b) show embodiments in which two resilient holding members are used.
Figure 9B:
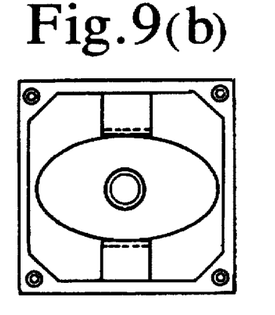
Figure 9C:
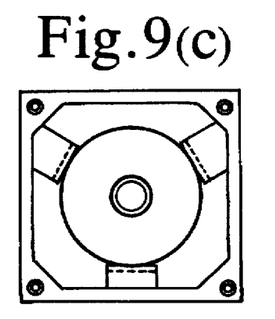
FIGS. 9(c) and 9(d) show embodiments in which three resilient holding members are used.
Figure 9D:
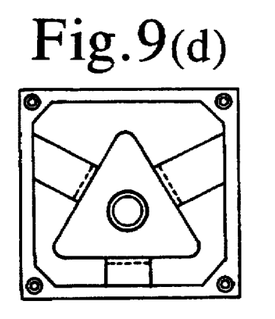
Figure 9E:
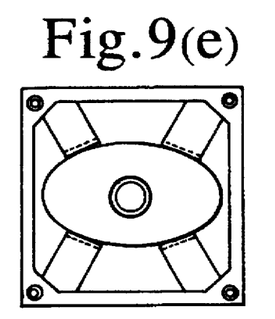
FIGS. 9(e) to 9(g) show further embodiments in which four resilient holding members are used.
Figure 9F:
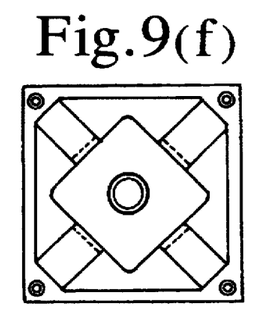
Figure 9G:
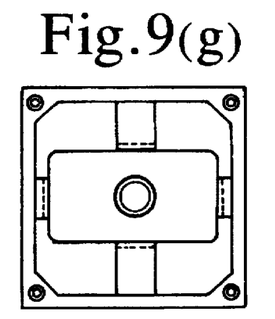
Figure 9H:
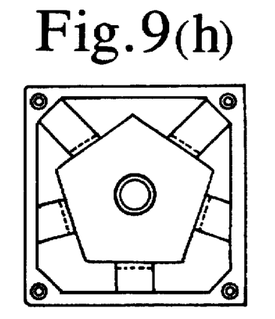
FIG. 9(h) shows still another embodiment of the present invention in which five resilient holding members are used.

In addition to the arrangements mentioned above, the resilient holding members 2, 2 ... may have the arrangements as shown in FIGS. 9(a) to 9(h): FIGS. 9(a) and 9(b) show arrangements in which the resilient holding members 2, 2 ... are disposed such that the article 3 is held from two directions. FIGS. 9(c) and 9(d) show arrangements in which the article 3 is held from three directions. FIGS. 9(e) to 9(g) show arrangements in which the resilient holding members 2, 2 ... are disposed such that the article 3 is held from four directions. FIG. 9(h) shows an arrangement in which the article 3 is held from five directions. The arrangement of the resilient holding members 2, 2 ... is determined based on the shape of the article to be held. In the embodiments shown in FIGS. 9(a) to 9(h), the resilient holding members 2, 2 ... are mounted, either directly or through mounting sections of the columns 12, 12 ... of the external frame member 1, on the external frame member 1. Other portions of the embodiments shown in FIGS. 9(a) to 9(h) are exactly the same in construction as the embodiments shown in FIGS. 1 and 2.

Figure 10A:
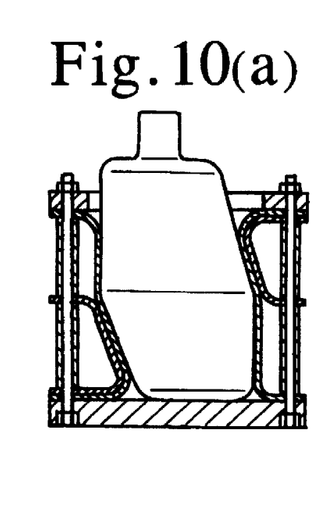
FIG. 10(a) shows an embodiment in which an upper portion or a lower portion of a pair of resilient holding members is doubled.
Figure 10B:
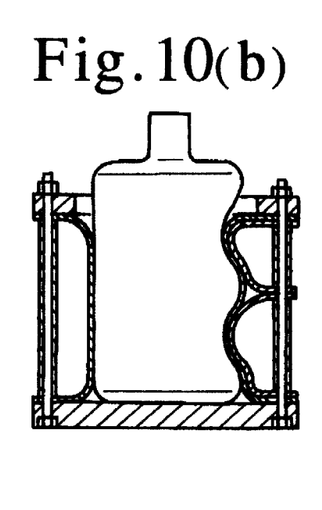
FIG. 10(b) shows another embodiment in which an upper portion and a lower portion of only one resilient holding member are separately doubled.
Figure 10C:
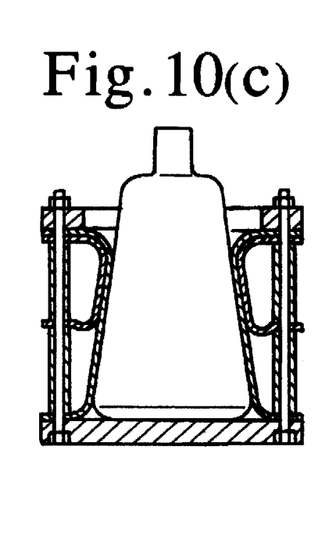
FIG. 10(c) shows a further embodiment in which only upper portions of all resilient holding members are doubled.

Besides the above-mentioned mounting shapes in which a single resilient holding member 2 is used for a single mounting location and two resilient holding members 2 are used for four mounting locations, the mounting form of the resilient holding members 2, 2 . . . may be varied according to the shape of the article to be held, as shown in FIGS. 10(a) to 10(c).

FIG. 10(a) shows another embodiment in which the upper portion of one of opposing resilient holding members has a double wall and the lower part of the other resilient member also has a double wall. According to this embodiment, the holding force of said upper portion is increased and holding force of said lower portion is also increased. FIG. 10(b) shows a further embodiment in which one of the opposing resilient holding members has a double wall. In this embodiment, three of the resilient holding members correspond to the shape of the article, and the upper portions and lower portions are separately doubled. FIG. 10(c) shows a still further embodiment in which upper portions of both opposing resilient holding members are doubled to increase the holding force with respect to the upper portion of the side surfaces of the article. Thus, since the resilient holding members 2 are partly or entirely double walled at places where the resilient holding members 2 are mounted, the holding force of the resilient member 2 can be finely adjusted in accordance with the shape of the article, and therefore the article can be held more reliably.

Mounting forms of the resilient holding members not shown in FIGS. 10(a) to 10(c) are determined according to the shape of the side surfaces of the article. The mounting forms are selected appropriately from that shown in FIG. 2, that shown in the right side of FIG. 10(a), that shown in the left side of FIG. 10(b), that shown in the right side of FIG. 10(b), that shown in FIG. 10(c), and their partly modified embodiments. By changing the arrangement and mounting of the resilient holding member, the device can cope with a variety of article shapes and hold the article more reliably.

Figure 11:
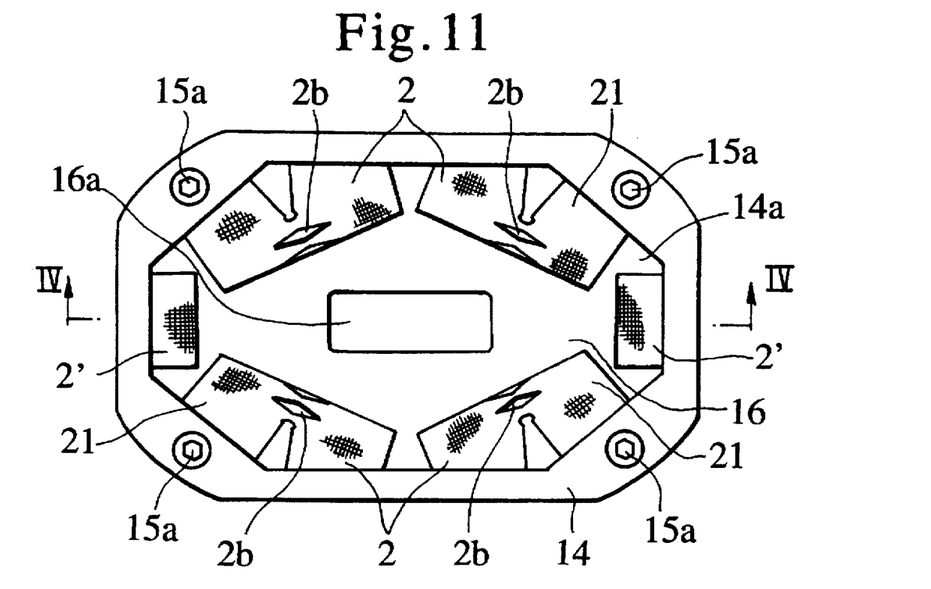
FIG. 11 is a plan view showing a third embodiment of the article holding device according to the present invention in which the article is not yet held in the device.
Figure 12:
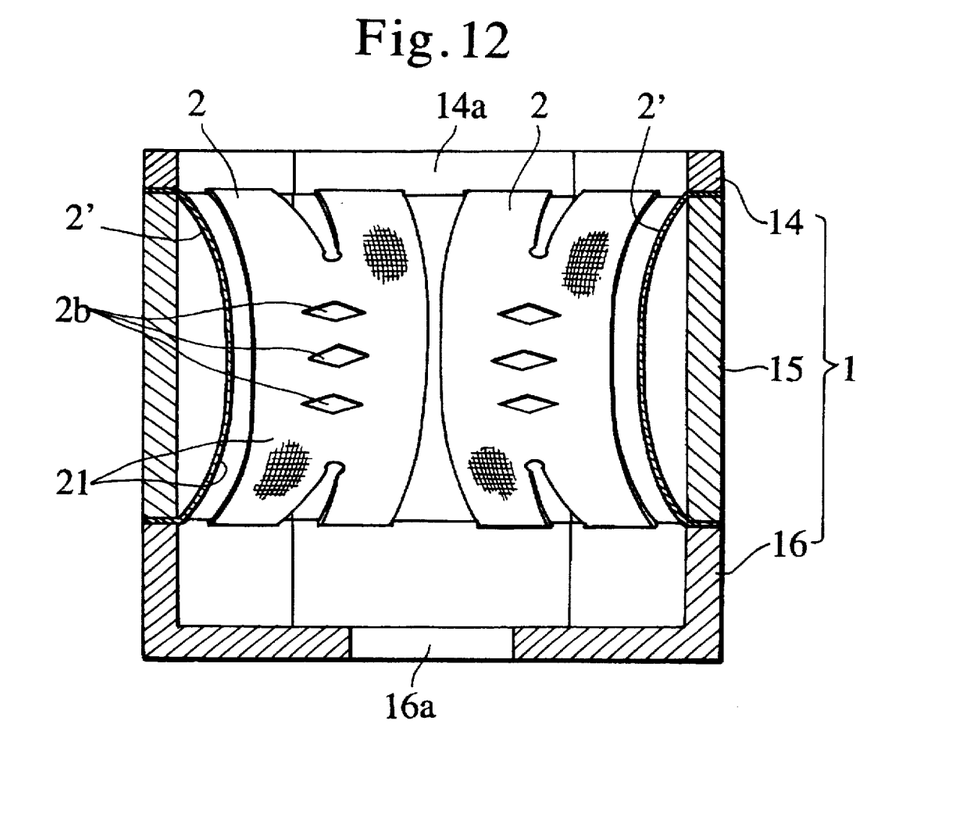
FIG. 12 is a sectional view taken along line IV—IV of FIG. 11.
Figure 13:
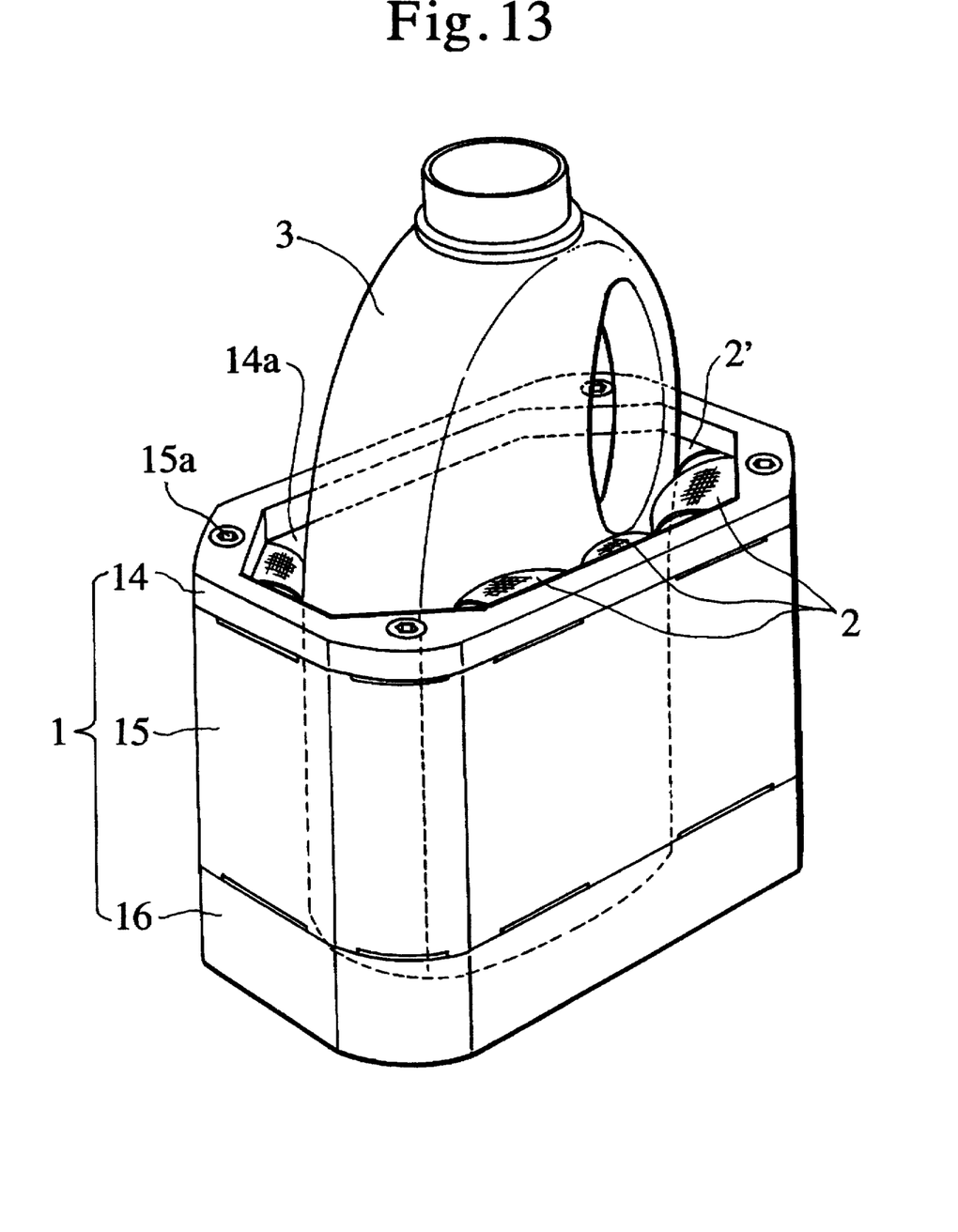
FIG. 13 is a perspective view showing the outer appearance of a third embodiment of the article holding device according to the present invention in which an article is disposed in the device.

FIGS. 11 to 14 show a third embodiment of the device for holding an article according to the present invention. The device for holding an article according to this embodiment (third embodiment) is constructed in a similar manner as the device for holding an article of the second embodiment. An external frame member 1 of the device comprises an upper member 14, an intermediate member 15, and a lower member 18. In this respect, the external frame member of the third embodiment is not different from the external frame member of the second embodiment. However, the external frame 1 of this embodiment (third embodiment) is so dimensioned as to be capable of receiving and holding an article as shown in FIG. 13. Accordingly, this embodiment (third embodiment) has a generally rectangular configuration in plan view. The intermediate member 15 is formed with a sleeve-like construction, and the lower member 18 is formed in a tub-like construction. Since the device for holding an article according to this embodiment (third embodiment) does not have an opening portion in its side surface, unlike the device for holding an article according to the second embodiment, the device of the third embodiment has the box-like construction of FIG. 13 when it is assembled using bolts 15a, 15a . . .

As the resilient holding member, two kinds of holding members 2 and 2' are employed. One kind of the resilient holding members has a generally H-shaped configuration. Diamond-like holes 2b, 2b' are formed in the central areas of the resilient holding members so that the resilient holding members themselves can be readily deformed. The other resilient holding members 2', 2' each has a belt-like configuration. Both the resilient holding members 2 and 2' are of a duplicate layer construction and concavities and convexities are formed on the surfaces 21 as in the case with the second embodiment.

Figure 14:
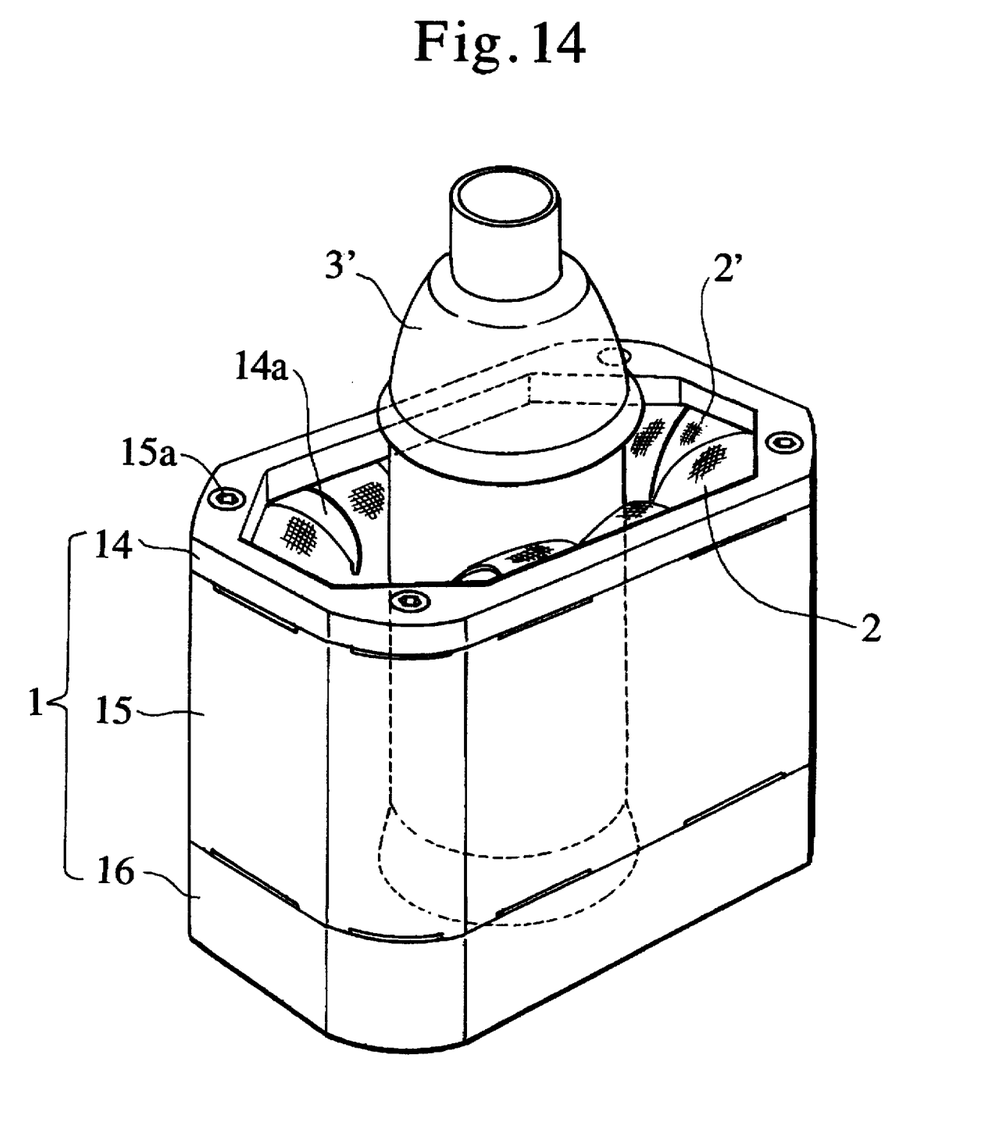
FIG. 14 is a perspective view showing the outer appearance of the third embodiment of the article holding device according to the present invention in which a different article is held in the device.

As in the case with the device for holding an article according to the second embodiment, the upper ends of the resilient holding members 2, 2' are sandwiched between the upper member 14 and the intermediate member 15, respectively, and the lower ends of the resilient holding members 2, 2' are sandwiched between the intermediate member 15 and the lower member 16, respectively. These component members are integrally assembled, as shown in FIG. 13, by bolts 15a, 15a . . . which extend from the upper member 14 to the lower member 18. The device for holding an article according to this embodiment (third embodiment) can receive and hold such an article having the shape as shown in FIG. 13. It can also receive and hold such an article 3' of a different shape as shown in FIG. 14. Thus, the device for holding an article according to this embodiment (third embodiment) can receive and hold an article of different shapes without changing any construction thereof.

Figure 15:
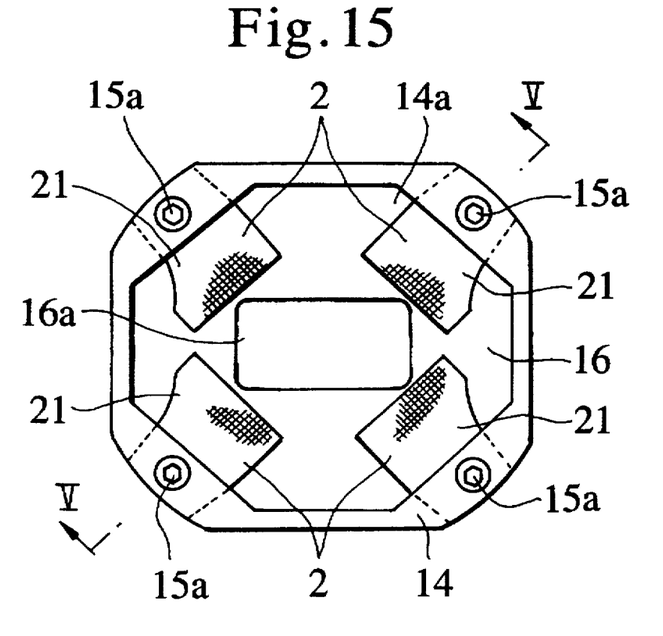
FIG. 15 is a plan view showing a fourth embodiment of the article holding device according to the present invention in which no article is disposed in the device.

FIGS. 14 and 15 show a fourth embodiment of a device for holding an article according to the present invention. The device for holding such an article is also constructed in a similar manner as the device of the second embodiment. However, an external frame member 1 in this embodiment (fourth embodiment) comprises an upper member 14, a first intermediate member 15, a second intermediate member 15', and a lower member 16. That is, the intermediate member 15 of the second embodiment is divided into a vertical portion serving as the first intermediate member 15 and a frame-like portion serving as the second intermediate portion 15'.

Figure 16:
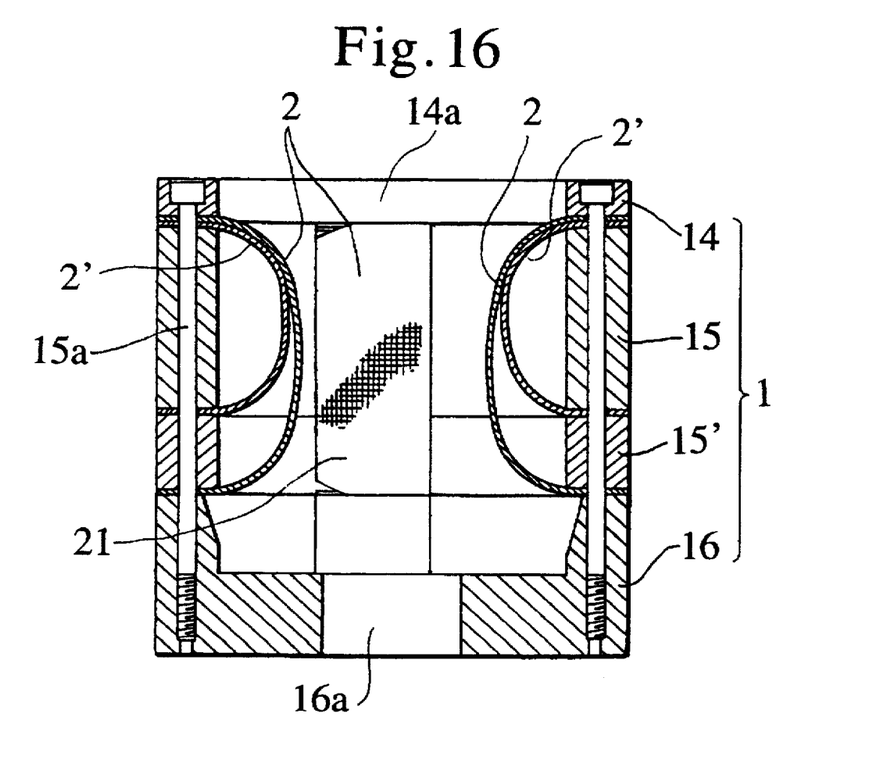
FIG. 16 is a sectional view taken along line V—V of FIG. 15.

The resilient holding members are mounted on four corners of the external frame member 1. The resilient holding members 2 and the resilient holding members 2' are mounted on the respective mounting portions in their overlapped states. Both the resilient holding members 2 and 2' are of a belt-like configuration but different in length from each other. The upper ends of the resilient holding members 2, 2' are sandwiched between the upper member 14 and the first intermediate member 15, respectively, and the lower ends of the resilient holding members 2' are sandwiched between the first intermediate member 15 and the second intermediate member 15', respectively. The lower ends of the resilient holding members 2 are sandwiched between the second intermediate member 15' and the lower member 18. Those component members are integrally assembled, as shown in FIG. 18, by bolts 15a, 15a . . . which extend from the upper member 14 to the lower member 16.

Figure 17:
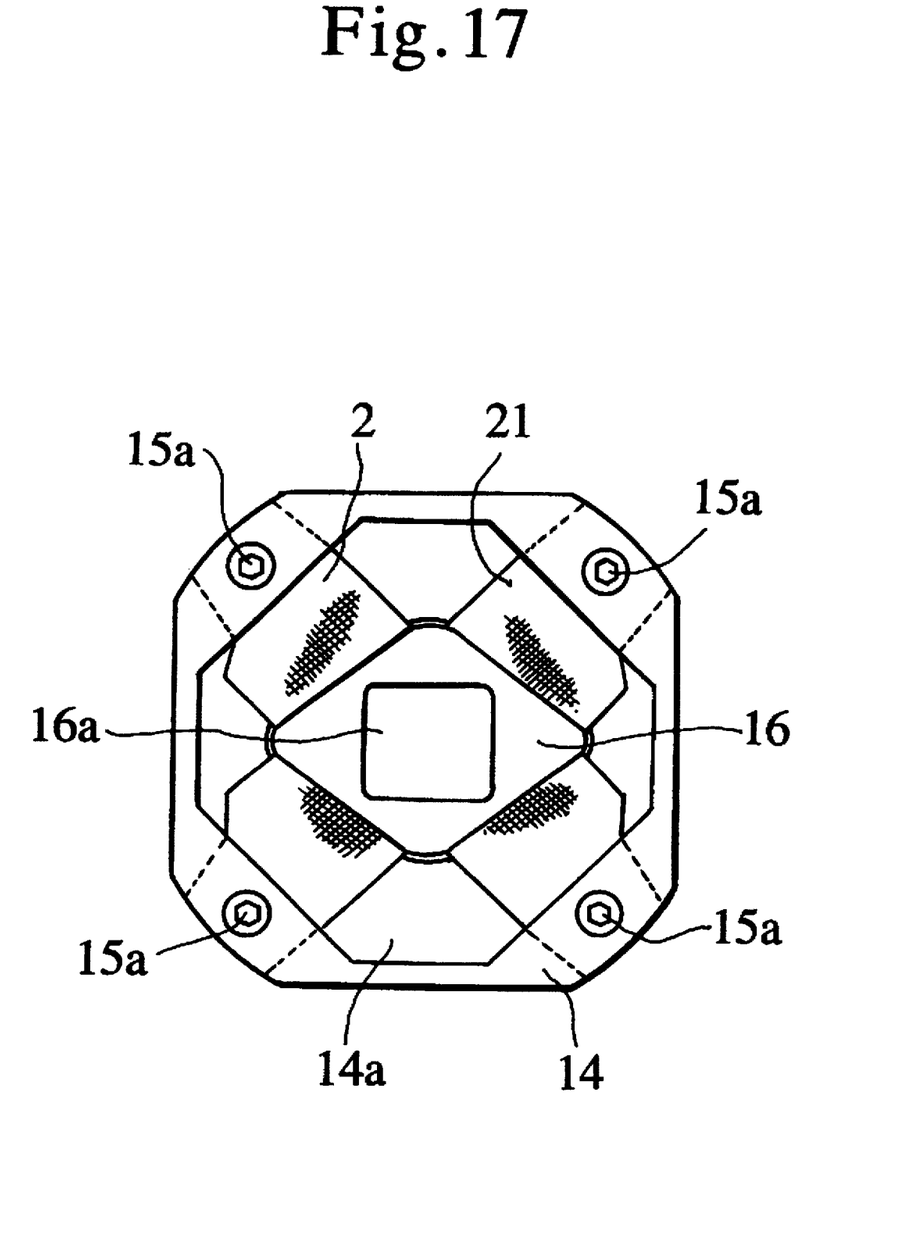
FIG. 17 is a plan view showing a fifth embodiment of the article holding device according to the present invention in which no article is disposed in the device.

FIG. 17 shows a fifth embodiment of a device for holding an article according to the present invention. This device is also constructed in a similar manner as the device for holding an article according to the second embodiment and has a single resilient holding member 2 of the type in which two resilient holding members of the second embodiment are connected with each other at the sides thereof.

The device for holding an article according to the present invention is not limited to the above embodiments. Although the external frame member 1 has a generally regular square shape or a generally octagonal shape in plan view, it may also have, for example, a circular shape or many other polygonal shapes. The number of the columns 12, 12 . . . and the manner in which they are constructed and connected are not limited to the above embodiments. The number, the material and the configuration of the resilient holding members 2 (and 2') are not limited to the above embodiments. In the above embodiments, for example, the thickness of the resilient holding members 2 (and 2') is constant. However, the thickness and width of the resilient holding members 2 (and 2') may be changed so that the holding force can be changed. The articles 3 (and 3') held by the device are containers for detergents and the like. However, it goes without saying that the types of articles have no limit. Also, the materials of the resilient holding members 2, 2' may be mutually applied in the respective embodiments. Other features may also be changed or modified, if necessary, without departing from the scope of the present invention.

What is claimed is:

1. A device for holding an article comprising:

an external frame member defining a chamber and having an opening at one end thereof; and a resilient holding member mounted within the chamber and capable of holding an article which has been introduced into the chamber, said resilient holding member having a generally X-shaped configuration with a slit formed in the central area thereof such that the resilient holding member itself can be readily, resiliently deformed, and said resilient holding member being mounted on the external frame member of the chamber such that the article is held by the resilient holding member in a desired position at a central portion of the chamber.

2. The device for holding an article according to claim 1, wherein a single or a plurality of the resilient holding members are arranged with surfaces thereof which extend toward the center of the chamber.

3. The device of claim 2, wherein the external frame defines a chamber having a generally square, rectangular, or octagonal configuration and the resilient holding members are disposed at selected locations along the walls of the chamber.

* * * * *